United States Patent

Sato et al.

[11] Patent Number: 5,899,330
[45] Date of Patent: *May 4, 1999

[54] ENCASING MECHANISM FOR A CASSETTE ENCLOSING A MAGNETIC RECORD MEDIUM

[75] Inventors: Makoto Sato; Takayoshi Ose, both of Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/627,949

[22] Filed: Apr. 3, 1996

[30] Foreign Application Priority Data

Apr. 7, 1995 [JP] Japan .................................. 7-082957

[51] Int. Cl.⁶ .................................................. B65D 85/672
[52] U.S. Cl. ..................................... 206/387.13; 206/472
[58] Field of Search ................................ 206/307, 387.1, 206/387.14, 387.13, 472, 473, 493

[56] References Cited

U.S. PATENT DOCUMENTS

| | | | |
|---|---|---|---|
| 3,620,361 | 11/1971 | Fuglwara et al. | 206/387.1 |
| 3,754,639 | 8/1973 | Gellert | 206/387.1 |
| 4,231,474 | 11/1980 | Takahashi | 206/387 |
| 4,235,334 | 11/1980 | Ahn | 206/387.1 |
| 4,291,801 | 9/1981 | Basili et al. | 206/387.14 |
| 4,363,403 | 12/1982 | Raucci, Jr. et al. | 206/387.13 |
| 4,512,470 | 4/1985 | Sieben | 206/387 |
| 4,593,814 | 6/1986 | Hagiwara | 206/387.13 |
| 4,865,195 | 9/1989 | Brands | 206/387.1 |
| 4,913,287 | 4/1990 | Kagano | 206/387.1 |
| 5,165,541 | 11/1992 | Morita | 206/387.1 |
| 5,277,313 | 1/1994 | Morita | 206/387.1 |
| 5,368,163 | 11/1994 | Gelardi | 206/387.1 |
| 5,499,714 | 3/1996 | Konno | 206/387.13 |

FOREIGN PATENT DOCUMENTS 3829928  3/1990  Germany ........................... 206/387.1

*Primary Examiner*—Paul T. Sewell
*Assistant Examiner*—Nhan T. Lam
*Attorney, Agent, or Firm*—McAulay Nissen Goldberg Kiel & Hand, LLP

[57] ABSTRACT

In an encasing mechanism for a cassette enclosing a magnetic record medium, the mechanism provides a cassette with a recess formed at a first surface of the cassette to identify first and second surfaces and first and second edges of the cassette, a case main body, and a cover coupled rotatably to the case main body to be openable relative to the case main body, in which the cover includes at least one projection formed on an inner surface of the cover. The projection is fitted into the recess so that the cover is closed relative to the case main body in an inserted arrangement of the cassette into the case main body. The encasing mechanism is capable of encasing the magnetic record medium cassette only when the cassette is correctly positioned in the case main body.

11 Claims, 4 Drawing Sheets

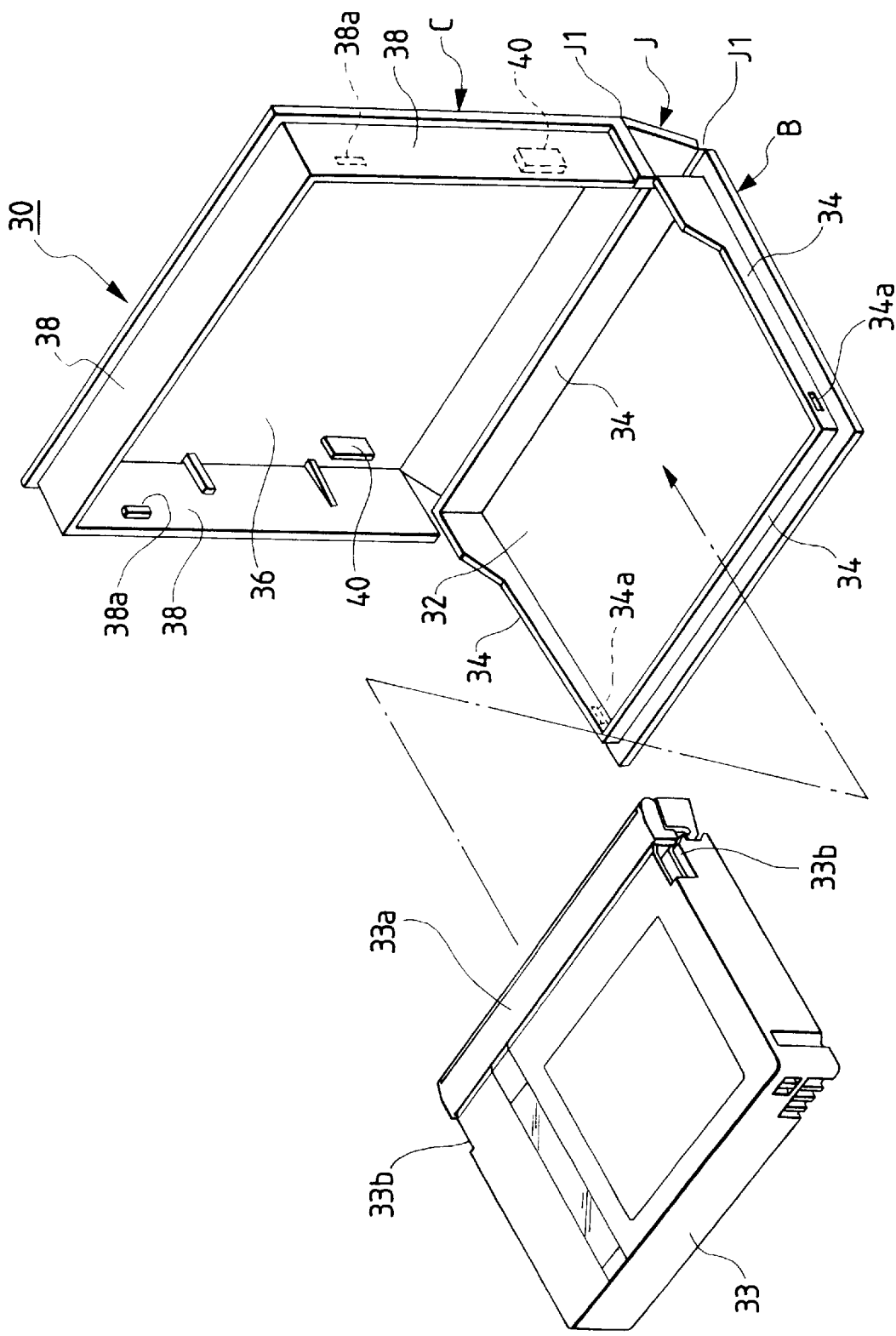

ENCASING MECHANISM FOR A CASSETTE ENCLOSING A MAGNETIC RECORD MEDIUM

BACKGROUND OF THE INVENTION

1. Field of the Invention

The present invention relates to a mechanism for encasing a cassette including various magnetic record mediums such as a tape cassette. More particularly, the present invention relates to such a case for encasing a cassette having a main case body and a cover which are connected for rotation relative to each other so that the cassette is closed or open, and further to a case for encasing a cassette in which the case is made with respect to operation for inserting the cassette into the case and taking a cassette out of the case.

2. Description of the Related Art

Magnetic record medium having a rectangular parallelepiped cassette shell such as a 8 mm cassette tape and a video tape cassette is usually preserved in a case for encasing a cassette in order to prevent that foreign material such as dust is adhered to a surface of data storing medium such as a magnetic tape or data storing medium is damaged.

Such a case includes, for instance, a so-called plastic case which is transparent and includes an assembly of a main case body and a cover, and a so-called hard case having a cover and a main case body connected to each other in facing relation through a connection having a hinged portion.

FIG. 1 illustrates an example of a conventional hard case for encasing a video cassette. A hard case 10 includes a main case body B and a cover C connected to each other in foldable fashion through a connection J.

The main case body B, the cover C and the connection J are integrally formed of flexible material such as synthetic resin. The main case body B and the cover C are designed to be able to be piled on top of another by a flexible connection J. A bottom plate 12 of the main case body B is formed at a circumference thereof with a frame 14 having a height and defining a space corresponding to a shape of a cassette, namely a space into which a cassette is to be inserted.

The cover C is formed at a lower surface of a roof 16 thereof with a frame 18 having a height and extending along a front end and left and right sides of the roof 16. The frame 18 is designed to externally cover the frame 14. In inserting a magnetic tape cassette 20 into the case 10, while the hard case 10 is maintained to be open as illustrated in FIG. 1, the magnetic tape cassette 20 is put into the main case body B, and then the cover C is closed. Since the cassette 20 is restricted in position so that all sides of the cassette 20 is held by the frame 14 defining cassette storing space, it is preferable for the cassette storing space to have little gap relative to the cassette.

Various attempts have been made to prevent unexpected opening of the cover of the case. For instance, the cover C is formed at inner side of the frame 18 in the vicinity of the front end of the roof 16 with ribs 22. The ribs 22 cooperate with the adjacent frame 18 to hold the frame 14 between the ribs, so that the hard case is prevented from opening unexpectedly.

As mentioned above, most of cases such as the above mentioned hard case for encasing a magnetic record medium cassette is formed merely with a space into which a magnetic tape cassette is to be inserted. Since a direction in which a magnetic tape cassette is inserted into a case is not regulated, a magnetic tape cassette may be inserted into a case bottom up. If a magnetic tape cassette is inserted into a cassette case bottom up, when the magnetic tape cassette is taken out of the cassette case, an operator may seize the magnetic tape cassette at its tape guard panel side, which would cause the magnetic tape to be damaged.

In order to resolve such a problem, Unexamined Japanese Utility Model Publication No. 4-106285 has suggested a cassette case for preventing bottom up insertion of a magnetic tape cassette, which case is formed with a projection which is designed to fit into a recess formed on a reverse surface of a magnetic tape cassette.

However, in the suggested cassette case, since the projection of the cassette case is fit into the magnetic tape cassette, it is necessary, when the magnetic tape cassette is to be taken out of the case, to seize up the magnetic tape cassette in a direction for disengaging the magnetic tape cassette from the projection. Namely, the suggested case has a problem of some difficulty on taking the magnetic tape cassette out of the case.

In addition, the projection disposed on a bottom of the cassette case poses another problem particularly when a cassette case is made of light-permeable material. Namely, when an index card is interposed between a bottom of a such cassette case and a reverse surface of the magnetic tape cassette, it is not possible to read out contents written on the index card from outside of the cassette case. In such a case, it is possible to insert a magnetic tape cassette into a case with an index card lying on a top surface of the magnetic tape cassette. However, such insertion causes another problems that design on a top surface of the magnetic tape cassette cannot be seen, that if data is written on a top surface of the magnetic tape cassette, it is not possible to see such date, and that the index card has to be dealt together with the magnetic tape cassette when the magnetic tape cassette is to be taken out of or to be inserted into the cassette case with the result of poor operation efficiency.

SUMMARY OF THE INVENTION

In view of conventional circumstances, the present invention has an object to provide a case for encasing a cassette containing magnetic record medium, which case is capable of encasing a magnetic record medium cassette only when the cassette is correctly positioned, taking the magnetic record medium cassette out of the case without paying attention to whether the case is engaged to the cassette, and allowing to dispose an index card between the cassette case and a reverse surface of the magnetic record medium cassette.

The present invention provides an encasing mechanism for a cassette enclosing a magnetic record medium, the mechanism provides a cassette with a recess formed at a first surface of the cassette to identify first and second surfaces and first and second edges of the cassette, a case main body, and a cover coupled rotatably to the case main body to be openable relative to the case main body, in which the cover includes at least one projection formed on an inner surface of the cover. The projection is fitted into the recess so that the cover is closed relative to the case main body in an inserted arrangement of the cassette into the case main body.

In a preferred embodiment, the cassette enclosing magnetic record medium includes a main case body containing a pair of reels around which a magnetic tape is wound, the main case body is formed at a front end thereof with a front opening and also formed at a bottom surface thereof with a bottom opening which is in connection with the front opening, the magnetic tape being passed along the front opening, and a guard panel having arm portions journaled at opposite side ends of the main case body and rotatable so that the guard panel closes the front opening of the main case body. The main case body is formed at an upper portion of left and right side ends thereof with recessed portions through which the guard panel is to be guided so that the magnetic tape passed along the front opening is exposed when the guard panel is made to rotate towards an upper surface of the main case body. The projection is designed so that it fits into the recessed portions.

In the case for encasing a cassette containing magnetic record medium provided in accordance with the invention, the case is formed at an inner surface thereof with the projection. The projection is allowed to fit into the recess of the cassette only when the cover is closed relative to the main case body with the magnetic record medium cassette contained in the main case body being correctly positioned, namely, the cassette being positioned in a only way designated with respect to front-rear and top-bottom of the cassette.

Thus, when the cover is closed with the magnetic record medium cassette being correctly positioned, the projection is allowed to fit into the recess of the case, and hence the cover is completely closed relative to the case, resulting in that the cassette can be contained in the case. To the contrary, when the cover is closed with the magnetic record medium cassette being incorrectly positioned, the projection is not allowed to fit into the recess and abuts the cassette. Thus, the cover is not allowed to be closed, resulting in that the cassette cannot be contained in the case.

On taking out a magnetic record medium cassette, the cover is fully open, and in addition, the recess of the cassette is disengaged from the projection of the case. Thus, the magnetic record medium cassette can be readily taken out of the cassette case without paying attention to whether the case is engaged to the cassette.

In addition, it is allowed to form a bottom of the main case body to be flat, and hence it is possible to dispose an index card between a reverse surface of the magnetic record medium cassette and a bottom of the main case body.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 2A is a perspective view of a case made in accordance with the first embodiment of the present invention with the case being open;

DESCRIPTION OF THE PREFERRED EMBODIMENTS

Preferred embodiments in accordance with the present invention will be explained hereinbelow with reference to drawings.

Figure 1:
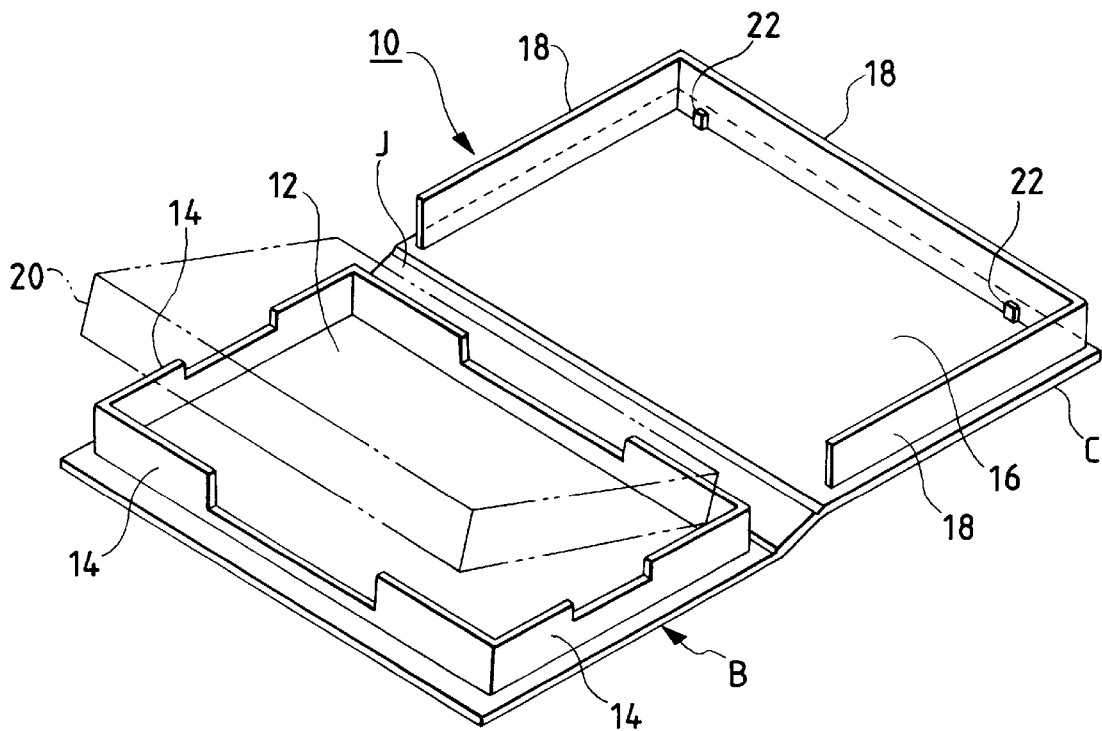
FIG. 1 is a perspective view of a conventional case for encasing a magnetic record medium cassette with the case being open.

FIG. 2A is a perspective view illustrating a case made in accordance with the first embodiment of the present invention with the case being open. A case 30 in which a cassette is to be contained includes a main case body B and a cover C connected to each other through a connection J in a foldable fashion. The main case body B, the cover C and the connection J are integrally formed of thermoplastic synthetic resin. The main case body B and the cover C are designed to be foldable one on top of the other by a pair of thin-walled portions J1 acting as a hinge through which the connection J is connected to the main case body B and the cover C. On a bottom plate 32 of the main case body B is formed at a circumference thereof a frame 34 having a height and defining a space corresponding to an external shape of a cassette 33 in which magnetic record medium is to be contained. As illustrated in FIG. 1, the frame 34 has almost the same height as that of the cassette 33 at a rear wall disposed in the vicinity of and juxtaposed with the connection J, and a lower height than that of the cassette 33 at a front half thereof, so that it becomes easy to insert the cassette into and take the cassette out of the case 30.

On a reverse surface of a roof 36 of the cover C is formed a frame 38 at a front and left and right sides (namely, three sides) thereof. The frame 38 is designed correspondingly to the frame 34 so that the frame 38 externally covers the frame 34. The frame 38 has a height almost equal to or slightly greater than a thickness of the cassette 33.

The frame 38 is formed with a pair of projections 38a at an inner surface of the left and right sidewalls thereof in the vicinity of the front wall thereof. The pair of projections 38a engage to a pair of recesses formed on an external surface of the frame 34 when the cover C is closed relative to the main case body B with the frame 38 externally engaging to the frame 34. This prevents unexpected opening of the case 30, and hence ensures protection of the cassette encased in the case 30.

The roof 36 is formed at left and right side ends and in the vicinity of the connection J with a pair of projections 40 between which the cassette is to be held. When the main case body B is closed relative to the cover C with the magnetic tape cassette 33 being correctly positioned, the pair of projections 40 are allowed to fit into recesses 33b formed on an upper surface of the magnetic tape cassette 33 so that front-rear and left-right relations of the cassette can be identified. Herein, "an upper surface" of the magnetic tape cassette 33 is defined as a surface disposed oppositely to a reverse surface in a magnetic tape cassette having recess and projection, holes or cut-outs which are different in shape between top and reverse surfaces thereof, and herein "a reverse surface" is defined as a surface formed with an opening through which a drive shaft of a regenerator is inserted into a magnetic tape cassette in order to drive a pair of tape reels including hubs.

Figure 2B:
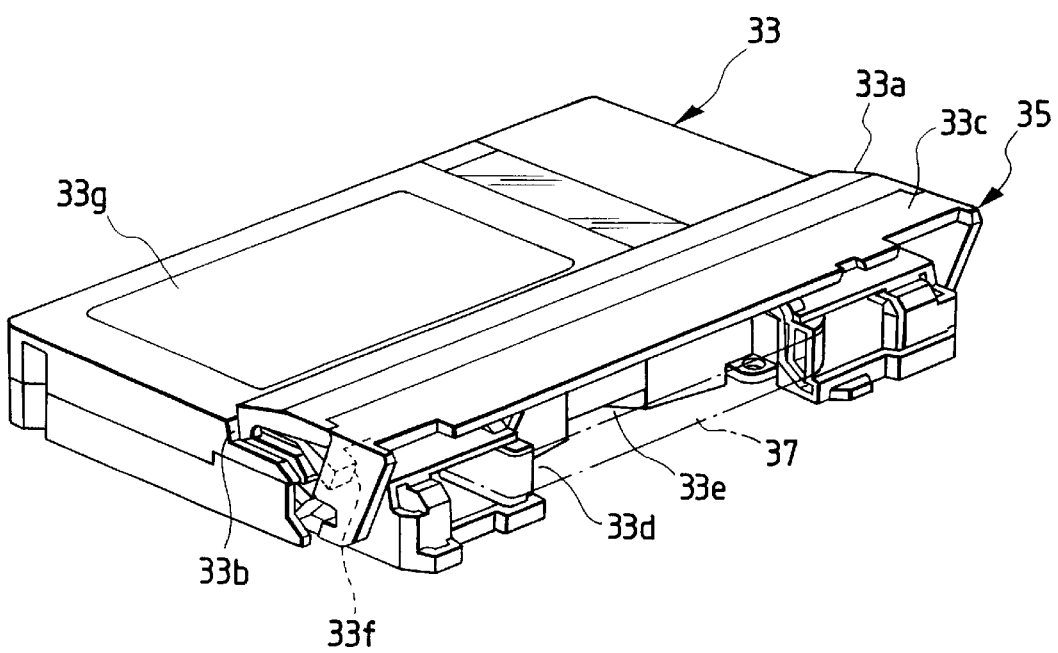
FIG. 2B is a perspective view of a cassette having a guide panel with a magnetic tape being exposed.

FIG. 2B shows an example of a magnetic tape cassette having a guard panel, such as VHS cassettes, 8 mm video cassettes, DAT cassettes and digital video cassettes (DVC). In particular, FIG. 2B shows the guard panel 35 which is rotated towards an upper surface of the cassette 33 to expose a magnetic tape 37. The magnetic tape cassette 33 includes a main case body 33g containing a pair of reels (not shown) around which the magnetic tape 37 is wound. The main case body 33g is formed at a front end thereof with a front opening 33d and also formed at a bottom surface thereof with a bottom opening 33e which is in connection with the front opening 33d. The magnetic tape is passed along the front opening 33d. The magnetic tape cassette 33 further includes the guard panel 35 having arm portions 33f journaled at opposite side ends of the main case body 33g and rotatable so that the guard panel 35 closes the front opening 33d of the main case body 33g. The magnetic tape 37 passed along the front opening 33d is exposed when the guard panel 35 is made to rotate towards an upper surface of the main case body 33d. Many types of such a guard panel are known, for instance, one of which covers only a front surface of a magnetic tape passed along the front opening, and the other interposes both front and reverse surfaces of a magnetic tape to cover the surfaces.

The tape cassette 33 is of a DCV cassette as an example of such magnetic tape cassettes. FIGS. 2A and 2B perspectively illustrate an upper surface of the tape cassette 33 having the recesses 33b for opening and closing a lid 33a. The recesses 33b are disposed on an upper surface of and at left and right sides of the magnetic tape cassette 33, and to the rear of the lid 33a. The recesses 33b act as a guide groove when the lid 33a is to be open, and are positioned so that front or rear and upper or reverse of the magnetic tape cassette 33 can be identified. In other words, the recesses 33b are positioned so that they are not point-symmetric about a center point of the upper surface of the magnetic tape cassette 33, they are not mirror-symmetric about the reverse surface of the magnetic tape cassette 33, and they are not point-symmetric about a center of the magnetic tape cassette 33. This kind of the tape cassettes are described in detail in U.S. Pat. No. 5,438,471 (see, especially, FIGS. 19 to 23 of the patent) which is incorporated herein by reference.

Figure 3:
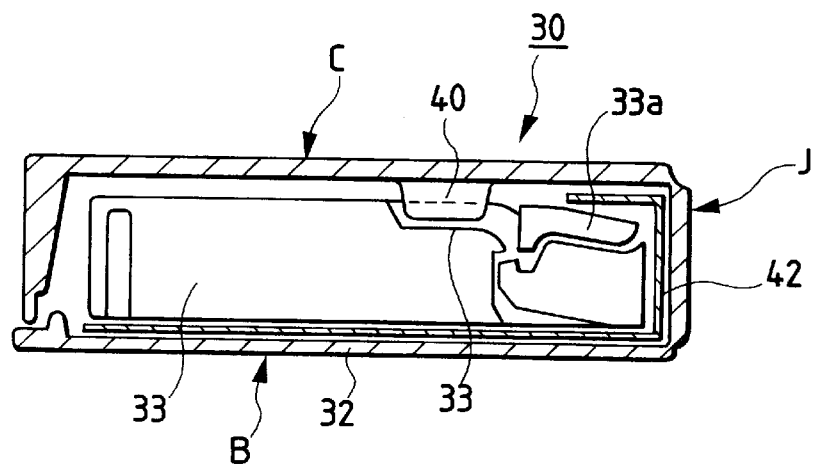
FIG. 3 is a cross-sectional view of the case made in accordance with the first embodiment with the magnetic record medium cassette being inserted into the case.

Thus, when the cover C of the case 30 is closed with the magnetic tape cassette 30 being correctly positioned, the projections 40 formed on the roof 36 of the cover C fit into the recesses 33b, as illustrated in FIG. 3. Hence, since the cover C of the case 30 can be completely closed, it is possible to encase the magnetic tape cassette 33 within the case 30.

To the contrary, when the cover C of the case 30 is closed with the magnetic tape cassette 33 being incorrectly positioned, the projections 40 are not allowed to fit into the recesses 33b, and abut the magnetic tape cassette 33. Thus, the cover C of the case 30 is not allowed to be completely closed, resulting in that the magnetic tape cassette 33 cannot be encased in the case 30.

On taking out the magnetic tape cassette 33, the cover C is open, and in addition, the recesses 33b of the magnetic tape cassette 33 are disengaged from the projections 40 of the case 30. Thus, the magnetic tape cassette 33 can be readily taken out of the cassette case 30.

In addition, since it is allowed to form a bottom of the main case body B to be flat, it is possible to dispose an index card 42 between the reverse surface of the magnetic tape cassette 33 and the bottom plate 32 of the main case body B, as illustrated in FIG. 3.

Though the projections 40 project from the roof 36 in the first embodiment illustrated in FIG. 1, it should be noted that the projections may project from the left and right sidewalls 38.

Figure 4:
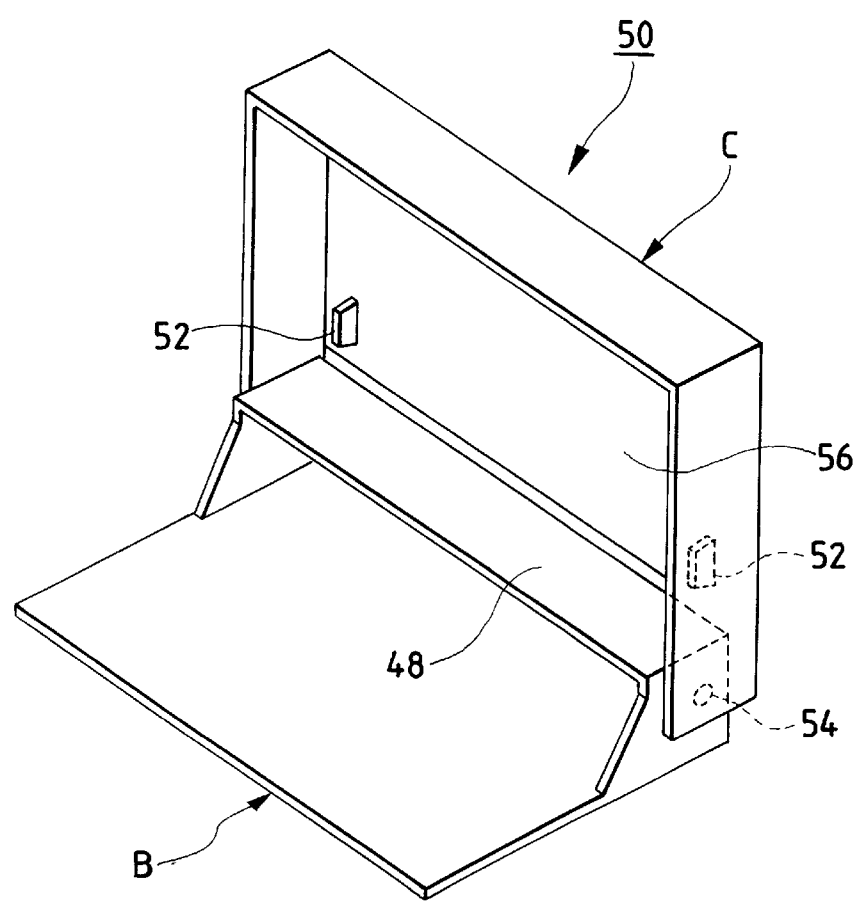
FIG. 4 is a perspective view of a case made in accordance with the second embodiment of the present invention with the case being open.

The present invention is not to be limited to the above mentioned first embodiment in which the case includes the connection J for opening and closing, but may apply to a case such as a plastic case 50 including the main case body B with which is integrally formed a pocket 48 in which a magnetic tape cassette is to be inserted, as illustrated in FIG. 4.

Hereinbelow, with reference to FIG. 4, will be explained the second embodiment in which the plastic case 50 is formed with a pair of projections 52 which is to fit into a cassette. The parts of the second embodiment which are the same as or similar to those of the first embodiment have been provided the same reference numbers as those of the first embodiment, and will not be explained.

The plastic case 50 made in accordance with the second embodiment includes a transparent main case body B and a transparent cover C. The main case body B is formed at a side at which the cover C is connected to the main case body B with the pocket 48 into which a magnetic tape cassette is inserted. At left and right sides of the pocket 48 is supported the cover C for rotation through projections 54 such as a support shaft.

Thus, the cover C can rotate about the projections 54 for opening and closing. A roof 56 of the cover C is formed at the same sides of the projections 54 with a pair of projections 52 which is to insert into a cassette. The pair of the projections 52 are allowed to fit into the recesses 33b (see FIG. 2A) of the magnetic tape cassette 33 similarly to the first embodiment, when the main case body B is closed to the cover C with the magnetic tape cassette 33 being correctly positioned. Thus, the case made in accordance with the second embodiment provides the same advantages as those of the first embodiment.

Figure 5:
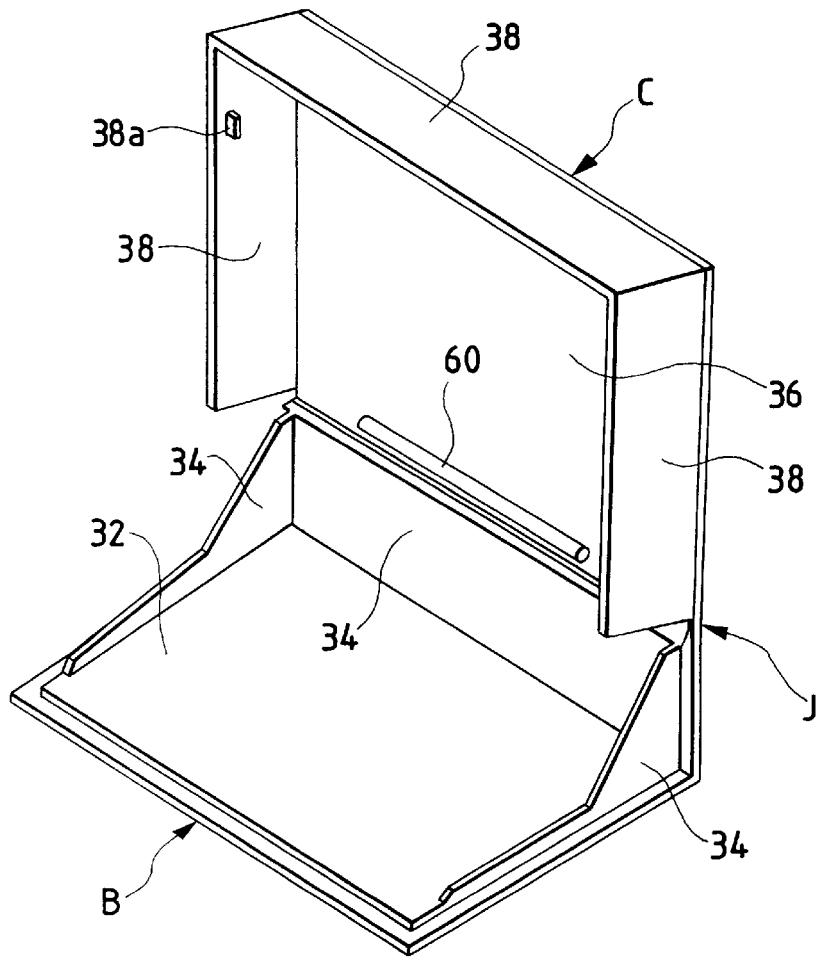
FIG. 5 is a perspective view of a case made in accordance with the third embodiment of the present invention with the case being open.

In the above mentioned first embodiment, the pair of projections 40 are formed on the roof 36 of the cover C. However, a projecting member 60 formed on the roof 36 of the cover C may be substituted for the projections 40 as shown in the third embodiment illustrated in FIGS. 5 and 6.

Figure 6:
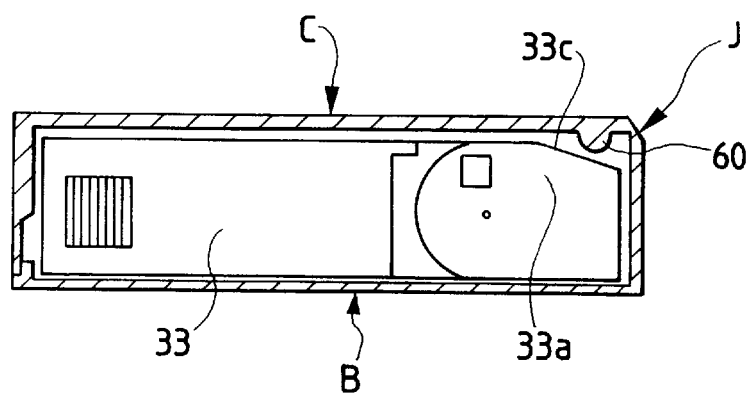
FIG. 6 is a cross-sectional view of the case made in accordance with the third embodiment with the magnetic record medium cassette being inserted into the case.

The projecting member 60 in the third embodiment faces an inclined surface 33c of the lid 33a of the magnetic tape cassette 33, as illustrated in FIG. 6, when the cover C and the main case body B are closed to each other with the magnetic tape cassette 33 such as a 8 mm video cassette being correctly positioned. Since the inclined surface 33c of the lid 33a corresponds to a position by which front or rear and top or reverse of the magnetic tape cassette 33 can be identified, the third embodiment can provide the same advantageous effects as those of the first embodiment. The parts of the third embodiment which are the same as or similar to those of the first embodiment have been provided the same reference numbers as those of the first embodiment, and will not be explained.

As a recess positioned so that front or rear and top or bottom of the magnetic tape cassette 33 can be identified, the first to third embodiments have the recesses 33b disposed at the rear of and at the left and right sides of the lid 33a for opening and closing the lid 33a, or the inclined surface 33c of the lid 33a. However, the recess is not to be limited to those, and may be in any form unless it can identify the front or rear and top or bottom of the magnetic tape cassette 33.

The magnetic tape cassette mentioned in the above embodiments includes a digital audio cassette, a 8 mm video tape cassette, and a video tape cassette having a width in the range of ½" to ¾", and also includes a disc cartridge or cassette containing a disc-shaped record medium.

As described above, the case for encasing a magnetic record medium cassette provided in accordance with the invention has at least one projection formed at an inner surface of the case. The projection is allowed to fit into a recess positioned so that it can identify front or rear and top or bottom of a magnetic tape cassette, when a cover is closed relative to a main case body with the magnetic tape cassette being correctly positioned in the main case body.

Thus, when the cover is closed with the magnetic record medium cassette being correctly positioned, the projection is allowed to fit into the recess of the case, and hence the cover is completely closed relative to the case, resulting in that the cassette can be contained in the case. To the contrary, when the cover is closed with the magnetic record medium cassette being incorrectly positioned, the projection is not allowed to fit into the recess and abuts the cassette. Thus, the cover is not allowed to be closed, resulting in that the cassette cannot be contained in the case. Accordingly, only a magnetic record medium cassette correctly positioned is allowed to be stored in the case.

On taking out a magnetic record medium cassette, the cover is fully open, and in addition, the recess of the cassette is disengaged from the projection of the case. Thus, the magnetic record medium cassette can be readily taken out of the cassette case without paying attention to whether the case is engaged to the cassette.

In addition, it is allowed to form a bottom of the main case body to be flat, and hence it is possible to dispose an index card between a reverse surface of the magnetic record medium cassette and a bottom of the main case body.

What is claimed is:

1. The combination of a storage medium cassette and a case for enclosing the cassette in a desired orientation, wherein said storage medium cassette comprises:

a reverse surface;

an upper surface;

recesses in the upper surface;

a storage medium;

an opening for access to said storage medium; and a guard pivotably mounted over said opening for protecting said storage medium;

wherein said case comprises:

a case body having an interior flat surface for receiving said reverse surface of said storage medium cassette;

a case cover movable between open and closed positions relative to said case body; and at least one projection extending from said case cover into said recesses when said case cover is in said closed position and said storage medium cassette is in said desired orientation; and wherein said at least one projection engages said upper surface and prevents said case cover from occupying said closed position for storage medium cassette orientations other than said desired orientation.

2. The combination of claim 1, wherein said upper surface is on said guard.

3. The combination of claim 1 further comprising a card insertable between said flat surface and said reverse surface.

4. The combination of claim 1 wherein said case further comprises a connecting portion connecting said case cover to said case body, said case cover, connecting portion and case body being integrally formed.

5. The combination of claim 4 wherein said case is formed from thermoplastic synthetic resin.

6. The combination of claim 4 wherein said connecting portion comprises:

a first hinge portion pivotably connected to said case body; and a second hinge portion pivotably connected to said case cover;

said case further comprising a frame connected to said case body, said frame and said case body defining said flat surface.

7. The combination of claim 6 wherein said frame comprises a rear wall and side walls, said side walls each having first and second ends, said first ends of said side walls each being positioned closer to said rear wall then said second ends of said side walls; said rear wall being a first height and said side walls each having second heights at said second ends, said second heights being less than said first height to facilitate insertion and removal of said cassette.

8. The combination of claim 7 wherein said case further comprises means for maintaining said case cover in said closed position.

9. The combination of claim 8 wherein said means for maintaining said case in said closed position comprises a projection on a side wall of said case cover engageable with a recess in one of said side walls when said cover occupies said closed position.

10. The combination of claim 1 wherein said case has a pair of projections, said pair of projections having at least a portion of said storage medium cassette therebetween when said storage medium cassette is in said desired orientation and said case cover is in said closed position.

11. The combination of claim 1 wherein said cassette is selected from the group of cassettes consisting of a DVC cassette and an 8 millimeter cassette.

* * * * *